(12) United States Patent
Short (10) Patent No.: US 12,012,074 B2
(45) Date of Patent: Jun. 18, 2024

(54) GUIDE-ON POST WITH INTEGRATED STEPS

(71) Applicant: Brandon Short, Flagstaff, AZ (US)

(72) Inventor: Brandon Short, Flagstaff, AZ (US)

(*) Notice: Subject to any disclaimer, the term of this patent is extended or adjusted under 35 U.S.C. 154(b) by 323 days.

(21) Appl. No.: 17/692,944

(22) Filed: Mar. 11, 2022

(65) Prior Publication Data

US 2022/0289111 A1 Sep. 15, 2022

Related U.S. Application Data

(60) Provisional application No. 63/161,243, filed on Mar. 15, 2021.

(51) Int. Cl.
*B60R 3/00* (2006.01)
*B60P 3/10* (2006.01)

(52) U.S. Cl.
CPC . *B60R 3/00* (2013.01); *B60P 3/10* (2013.01)

(58) Field of Classification Search
CPC ..................................... B60R 3/00; B60P 3/10
See application file for complete search history.

(56) References Cited

U.S. PATENT DOCUMENTS

| | | | | |
|---|---|---|---|---|
| 5,046,582 A * | 9/1991 | Albrecht | ................. | B60R 3/02 182/127 |
| 5,687,813 A * | 11/1997 | Bensch | ................. | B60R 3/007 182/127 |
| 6,003,633 A * | 12/1999 | Rolson | ................. | E06C 5/02 182/127 |
| 6,578,666 B1 * | 6/2003 | Miller | ................. | E06C 1/36 182/127 |
| 6,942,271 B1 * | 9/2005 | Jamison | ................. | B60R 3/007 296/61 |
| 7,025,174 B1 * | 4/2006 | Hawley | ................. | B60R 3/02 182/127 |
| 7,240,947 B2 * | 7/2007 | Kuznarik | ............ | B62D 33/0273 296/62 |
| 7,516,997 B2 * | 4/2009 | Kuznarik | ............ | B62D 33/0273 182/127 |
| 8,678,457 B1 * | 3/2014 | Duderstadt | ............... | B60R 3/00 296/1.02 |
| 8,985,660 B1 * | 3/2015 | Weber | ................. | B60R 3/005 296/62 |

(Continued)

FOREIGN PATENT DOCUMENTS

CN 111845571 A * 10/2020

*Primary Examiner* — Jacob B Meyer
(74) *Attorney, Agent, or Firm* — Booth Udall Fuller PLC; Rodney J. Fuller (57) ABSTRACT

A guide-on post with a base, an arm, and at least one step. The base is attached to a boat trailer. The arm is hingedly coupled to the base and has an outer side that faces away from the boat trailer. The arm is configured to rotate between a guiding position and a boarding position. When the arm is in the guiding position, the arm is in a substantially vertical upward direction, and when the arm is in the boarding position, the arm is rotated between 5 degrees and 180 degrees from the guiding position. The at least one step is coupled to the arm and is moveable between a stored position and an extended position. When in the stored position, the step is positioned within a perimeter of the boat trailer. When in the extended position, the step extends away from the outer side of the arm.

23 Claims, 11 Drawing Sheets

(56) References Cited

U.S. PATENT DOCUMENTS

| | | | | |
|---|---|---|---|---|
| 9,302,719 | B1* | 4/2016 | Krishnan | B60R 3/02 |
| 9,839,179 | B2* | 12/2017 | Stover | A01D 34/824 |
| 11,603,026 | B2* | 3/2023 | Miller | B60Q 1/24 |
| 2011/0168491 | A1* | 7/2011 | Cheatham, Jr. | E06C 5/24 |
| | | | | 280/166 |
| 2022/0041111 | A1* | 2/2022 | Sutter | B60R 3/02 |
| 2022/0289111 | A1* | 9/2022 | Short | B60R 3/02 |

* cited by examiner

GUIDE-ON POST WITH INTEGRATED STEPS

CROSS REFERENCE TO RELATED APPLICATIONS

This application claims the benefit of the filing date of U.S. Provisional Patent Application 63/161,243 entitled "Guide-On Post with Integrated Steps" to Brandon Short filed on Mar. 15, 2021, the disclosure of which is hereby incorporated herein by this reference.

TECHNICAL FIELD

Aspects of this document relate generally to a guide-on post for a boat, and more specifically to a guide-on post with integrated steps.

BACKGROUND

Before launching a boat from a trailer, a user must board the boat. This is typically done by boarding a swim platform at the stern of the boat, as the swim platform is lower than the sides of the boat and is designed to carry weight. Over time, however, boats used for recreation, such as wake surfing boats, have gotten larger. This is due, in part, to an effort to make more room for passengers, as well as to aid the boat in creating a larger wake. With larger boats, access to the swim platform has become more difficult when the boat is on the trailer because the swim platform is higher.

SUMMARY

Aspects of this document relate to a guide-on post comprising a base configured to attach to a boat trailer, an arm hingedly coupled to the base and having a length and an outer side configured to face away from the boat trailer, the arm configured to rotate in a direction perpendicular to the length between a guiding position and a boarding position, wherein when the arm is in the guiding position, the arm extends away from the base in a substantially vertical upward direction, and when the arm is in the boarding position, the arm is rotated between 20 degrees and 70 degrees from the guiding position, and at least one step coupled to the arm and moveable between a stored position and an extended position, wherein when the at least one step is in the stored position, the at least one step is positioned within a perimeter of the boat trailer and when the at least one step is in the extended position, the at least one step extends away from the outer side of the arm perpendicular to the length of the arm and extends outside of the perimeter of the boat trailer, wherein, when the arm is in the guiding position, the guide-on post is configured to indicate a location of the boat trailer when the boat trailer is submerged in water, and when the arm is in the boarding position and the at least one step is in the extended position, the guide-on post is configured to facilitate boarding a boat secured to the boat trailer.

Particular embodiments may comprise one or more of the following features. The at least one step may be configured to rotate about the length of the arm to move the at least one step between the stored position and the extended position. The at least one step may be configured to telescope into the arm to move into the stored position. The at least one step may be foldable with respect to the arm. The base may comprise a bracket and the arm may be hingedly coupled to the bracket, the bracket having a plurality of holes and a pin configured to extend through a hole of the plurality of holes and lock the arm in a position aligned with the hole of the plurality of holes. The at least one step may be configured to automatically move to the extended position when the arm moves to the boarding position.

Aspects of this document relate to a guide-on post comprising a base configured to attach to a boat trailer, an arm hingedly coupled to the base and having an outer side configured to face away from the boat trailer, the arm configured to rotate in a direction perpendicular to the arm between a guiding position and a boarding position, wherein when the arm is in the guiding position, the arm extends away from the base in an upward direction, and when the arm is in the boarding position, the arm is rotated away from the guiding position, and at least one step coupled to and extending away from the outer side of the arm, wherein, when the arm is in the guiding position, the guide-on post is configured to indicate a location of the boat trailer when the boat trailer is submerged in water, and when the arm is in the boarding position, the guide-on post is configured to facilitate boarding a boat secured to the boat trailer.

Particular embodiments may comprise one or more of the following features. The at least one step may be moveable between a stored position and an extended position, wherein when the at least one step is in the stored position, the at least one step is positioned within a perimeter of the boat trailer and when the at least one step is in the extended position, the at least one step extends away from the outer side of the arm outside of the perimeter of the boat trailer. When the arm is in the guiding position, the arm may extend away from the base in a substantially vertical upward direction and when the arm is in the boarding position, the arm may be rotated less than or equal to 90 degrees from the guiding position. The at least one step may be configured to rotate about a length of the arm to move the at least one step between a stored position and an extended position. The at least one step may be configured to telescope into the arm to move between a stored position and an extended position. The at least one step may be foldable with respect to the arm. The guide-on post may further comprise a handrail positioned adjacent to the arm and configured to provide a handhold for a user of the guide-on post.

Aspects of this document relate to a guide-on post comprising an arm configured to hingedly couple to a boat trailer and configured to rotate between a guiding position and a boarding position, and at least one step coupled to and extending away from the arm, wherein, when the arm is in the guiding position, the guide-on post is configured to indicate a location of the boat trailer when the boat trailer is submerged in water, and when the arm is in the boarding position, the guide-on post is configured to facilitate boarding a boat secured to the boat trailer.

Particular embodiments may comprise one or more of the following features. The arm may be configured to rotate between the guiding position and the boarding position in a direction perpendicular to the arm. The at least one step may be moveable between a stored position and an extended position, wherein when the at least one step is in the stored position, the at least one step is positioned within a perimeter of the boat trailer and when the at least one step is in the extended position, the at least one step extends away from the outer side of the arm outside of the perimeter of the boat trailer. When the arm is in the guiding position, the arm may extend away from the boat trailer in a substantially vertical upward direction, and when the arm is in the boarding position, the arm may be rotated less than or equal to 90 degrees from the guiding position. The at least one step may be configured to rotate about a length of the arm to move the at least one step between a stored position and an extended position. The at least one step may be configured to telescope into the arm to move between a stored position and an extended position. The at least one step may be foldable with respect to the arm. The arm may be configured to be operated both from a proximal end of the arm and from a distal end of the arm opposite the proximal end of the arm. The guide-on post may be configured to be stored beneath the boat on the boat trailer. The arm may be configured to break away from the guide-on post without causing damage to the arm.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
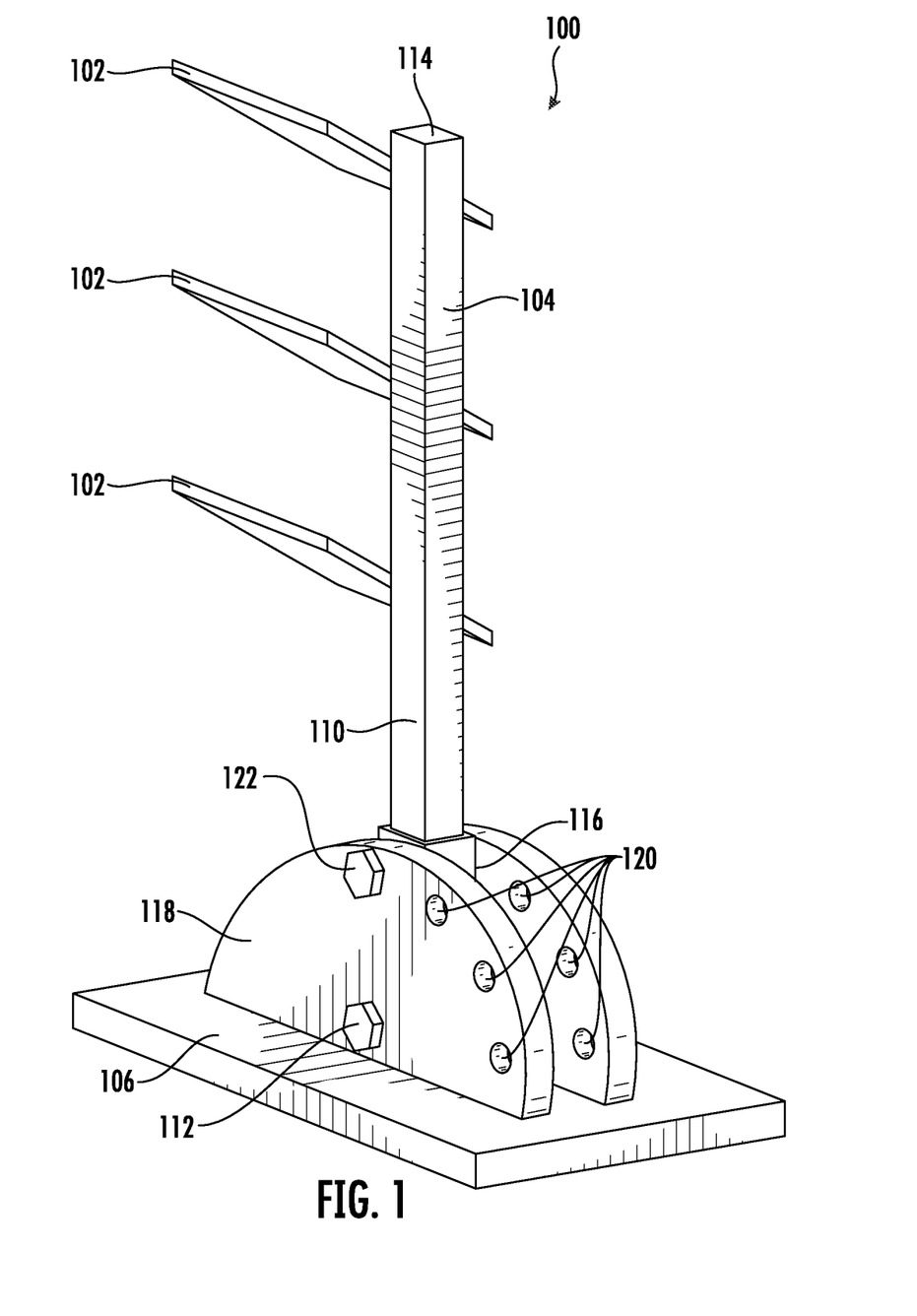
FIG. 1 is a perspective view of a guide-on post with integrated steps.
Figure 2:
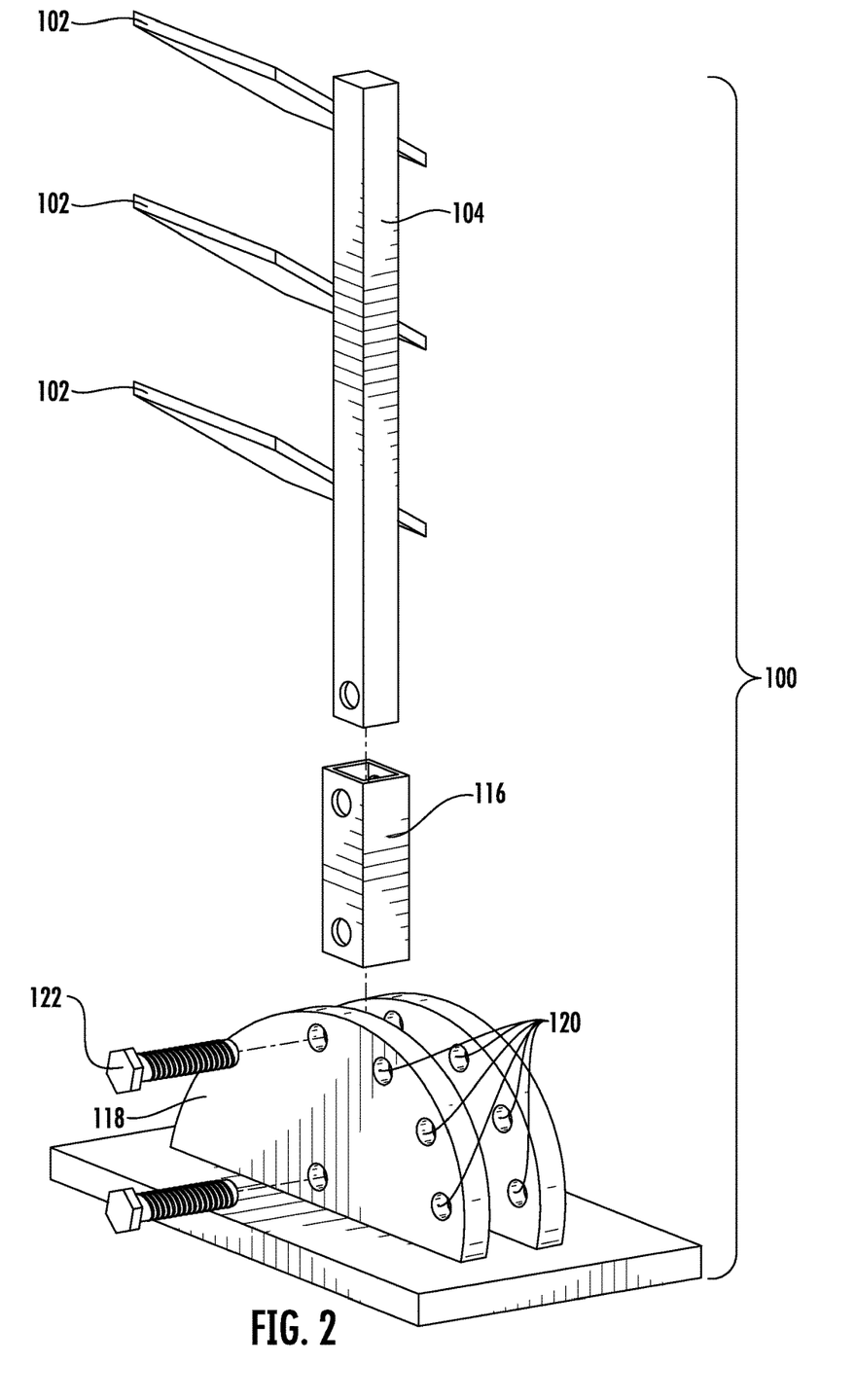
FIG. 2 is an exploded view of the guide-on post shown in FIG. 1.

This disclosure is related to a guide-on post 100 with integrated steps 102. The guide-on post 100 is configured to guide a boat 10 onto a boat trailer 20 and is also configured to facilitate boarding the boat 10 by providing steps 102. As shown in FIGS. 1 and 2, the guide-on post 100 comprises an arm 104 and at least one step 102 coupled to the arm 104. In some embodiments, the at least one step 102 has two steps 102, three steps 102 (as shown in the figures), or more than three steps 102. The guide-on post 100 may also comprise a base 106 which is configured to attach to the boat trailer 20. As will be apparent to one of skill in the art, the guide-on post 100 may be implemented on both sides of a boat trailer 20. Thus, while the accompanying drawings all depict a guide-on post 100 configured for use on the left side of a boat trailer 20, the guide-on post 100 is easily adjusted for use on the right side of a boat trailer 20. Specifically, any of the features depicted in the drawings need only be recreated as the mirror image of what is shown. To simplify this disclosure, only the left-side guide-on post 100 is discussed explicitly herein. However, the right-side guide-on post 100 is considered to be covered by this disclosure as well. Below, inner and outer sides of the guide-on post 100 are discussed. References to the inner side of the guide-on post 100 refer to the side of the guide-on post 100 configured to face the center of the boat trailer 20, while references to the outer side of the guide-on post 100 refer to the side of the guide-on post 100 configured to face away from the boat trailer 20.

Figure 6:
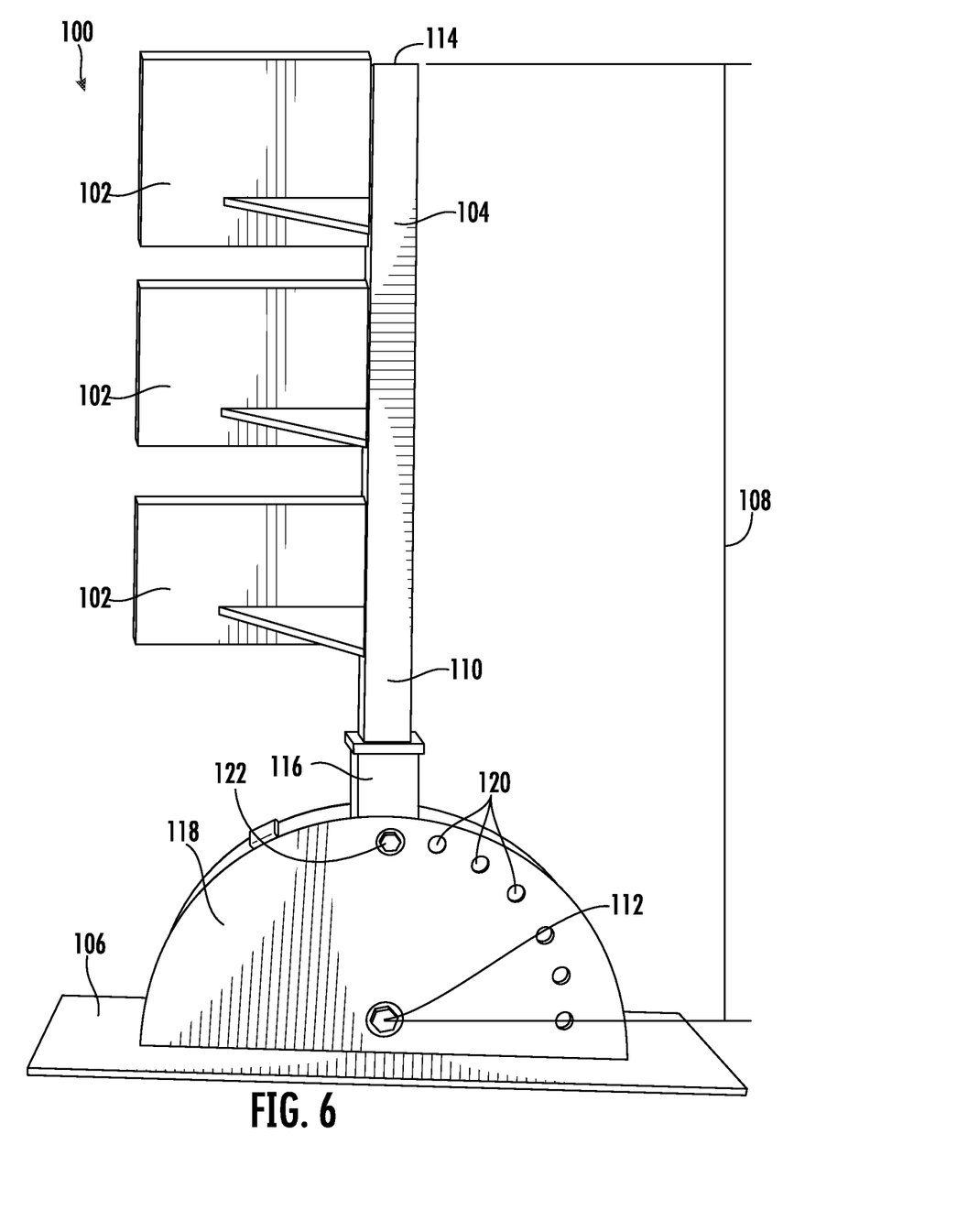
FIG. 6 is an outer side view of the guide-on post shown in FIG. 1 with the arm in the guiding position.

The arm 104 has a length 108, which is defined as the line between the attachment point 112 between the arm 104 and the base 106 or the boat trailer 20 and an endpoint 114 of the arm 104 distal to the attachment point 112. The arm 104 may also have an outer side 110 configured to face away from the boat trailer 20, as discussed above. The arm 104 may be configured to move between different positions. For example, the arm 104 may be hingedly coupled to the base 106 or to the boat trailer 20 at the attachment point 112. Thus, the arm 104 may rotate with respect to the base 106 or the boat trailer 20 to move between different positions. In some embodiments, the arm 104 is configured to rotate in a direction perpendicular to the length 108. For example, the arm 104 may rotate about the attachment point 112 (see FIGS. 6 and 7).

Figure 7:
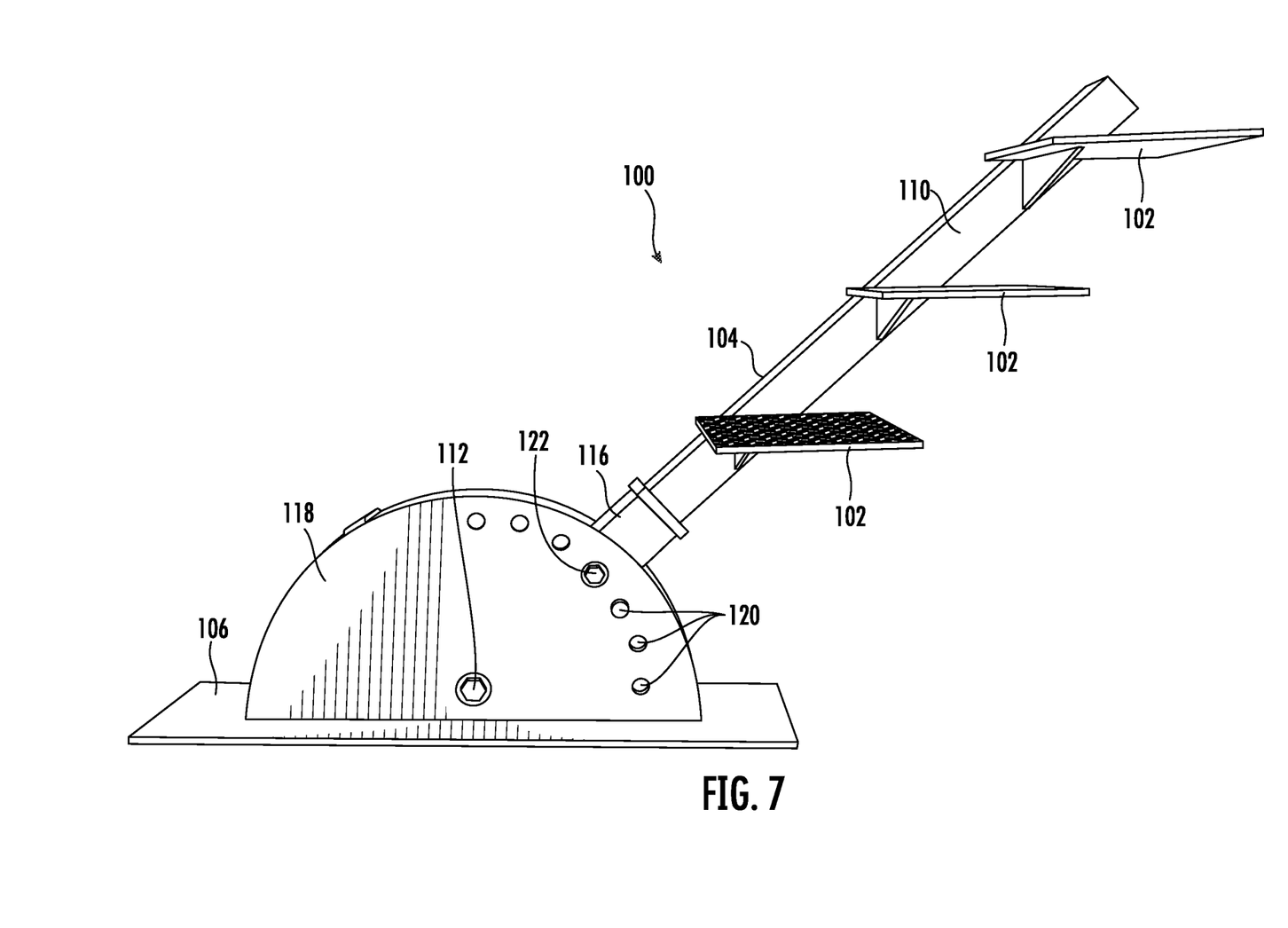
FIG. 7 is an outer side view of the guide-on post shown in FIG. 1 with the arm in the boarding position.

The arm 104 may move between a guiding position (see FIG. 6) and a boarding position (see FIG. 7). When the arm 104 is in the guiding position, the arm 104 extends away from the base 106 or the boat trailer 20 in an upward direction. This allows the arm 104 to extend above the boat trailer 20. When the boat trailer 20 is submerged in water, the arm 104 is still able to rise above the surface of the water, and thus be visible to a user guiding the boat 10 onto the boat trailer 20. In this way, when the arm 104 is in the guiding position, the guide-on post is configured to indicate a location of the boat trailer 20 when the boat trailer 20 is submerged in water. Knowing the location of the boat trailer 20 allows the user to correctly position the boat 10 on top of the boat trailer 20 for safe transport of the boat 10. In some embodiments, when the arm 104 is in the guiding position, the arm 104 extends away from the base 106 or the boat trailer 20 in a substantially vertical upward direction. Substantially vertical as used herein refers both to a perfectly vertical direction, where the endpoint 114 of the arm 104 is directly above the attachment point 112, and also encompasses up to 15-degree variations of a perfectly vertical direction.

The arm 104 may be rotated to move from the guiding position to the boarding position. The angle through which the arm 104 must travel to move from the guiding position to the boarding position varies based on the configuration of the guide-on post 100, the boat trailer 20, and the boat 10. Depending on the embodiment, the angle from the guiding position to the boarding position may be 45 degrees, between 20 and 70 degrees, between 5 degrees and 90 degrees, less than or equal to 90 degrees, between 5 degrees and 135 degrees, or between 5 degrees and 180 degrees. Rotating the arm 104 positions the arm 104 at an angle. This becomes especially helpful for embodiments of the guide-on post 100 that have more than one step 102 because the steps 102 are thus aligned diagonally rather than vertically, and function better as steps, as shown in FIG. 7. The guide-on post 100 is configured to facilitate boarding a boat 10 secured to the boat trailer 20 by climbing the steps 102 when the arm 104 is in the boarding position.

As shown in FIG. 2, the arm 104 may have a sleeve 116 into which the arm 104 is inserted to couple the arm 104 with the base 106 or the boat trailer 20. The sleeve 116 may be hingedly coupled with the base 106 or the boat trailer 20 to allow the arm 104 to move between the guiding position and the boarding position as disclosed above. In some embodiments, the sleeve 116 is fixedly coupled to the base 106 or the boat trailer 20, and instead of only one sleeve 116, the arm 104 has multiple sleeves 116 at different angles to allow the arm 104 to be positioned in the guiding position or the boarding position. The base 106 may have a bracket 118 that is configured to couple the arm 104 or the sleeve 116 to the base 106, as shown in FIGS. 1 and 2. The bracket 118 may have a plurality of holes 120 and a pin 122. The pin 122 is configured to extend through a hole 120 of the plurality of holes 120. The pin 122 can be used to lock the arm 104 in a position aligned with the hole 120 through which the pin 122 extends. Thus, the arm 104 can be moved into the guiding position and then locked in that position by inserting the pin 122 through the hole 120 of the bracket 118 that corresponds with the guiding position. Similarly, the arm 104 can be moved into the boarding position and then locked into that position by inserting the pin 122 through the hole 120 of the bracket 118 that corresponds with the boarding position.

The at least one step 102 may also be moveable between multiple positions. For example, the at least one step 102 may be moveable between a stored position and an extended position. When the steps 102 are in the extended position, the steps 102 may extend away from the outer side 110 of the arm 104, and thus also extend away from the boat trailer 20. This makes the steps 102 accessible when a boat 10 is loaded on the boat trailer 20. In some embodiments, when the steps 102 are in the extended position, the steps 102 extend outside of a perimeter of the boat trailer 20. For the purposes of this disclosure, any reference to the perimeter of the boat trailer 20 refers to the shape of the boat trailer 20 when viewed from a birds-eye view. Thus, when the steps 102 extend outside of the perimeter of the boat trailer 20, the step 102 add to some dimension of the boat trailer 20, such as adding to the width of the boat trailer 20. Because boat trailers 20 are often already built to a maximum width to fit into garages or to stay within a road lane during travel, having the steps 102 in the extended position may make the boat trailer 20 more difficult to maneuver. The ability to move the steps 102 into the stored position is helpful for this reason.

Figure 3:
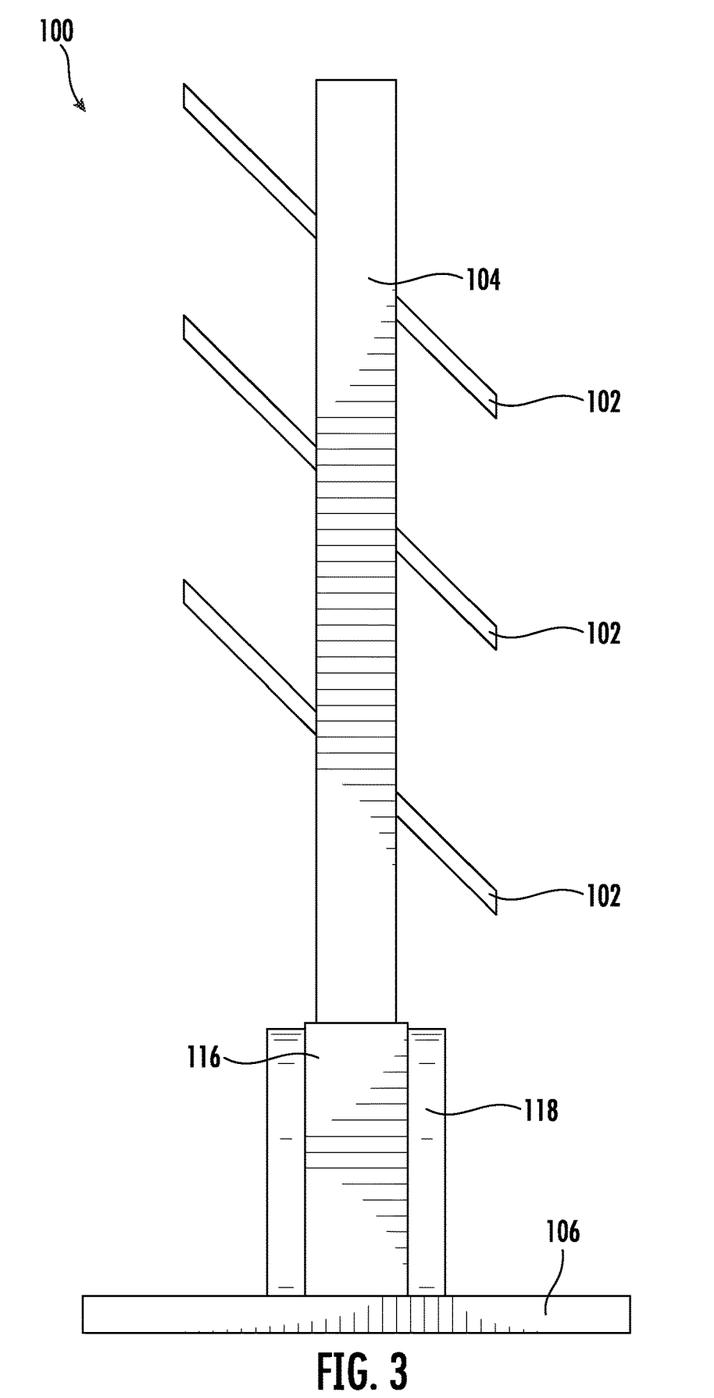
FIG. 3 is a front view of the guide-on post shown in FIG. 1 with the steps in the stored position.
Figure 4:
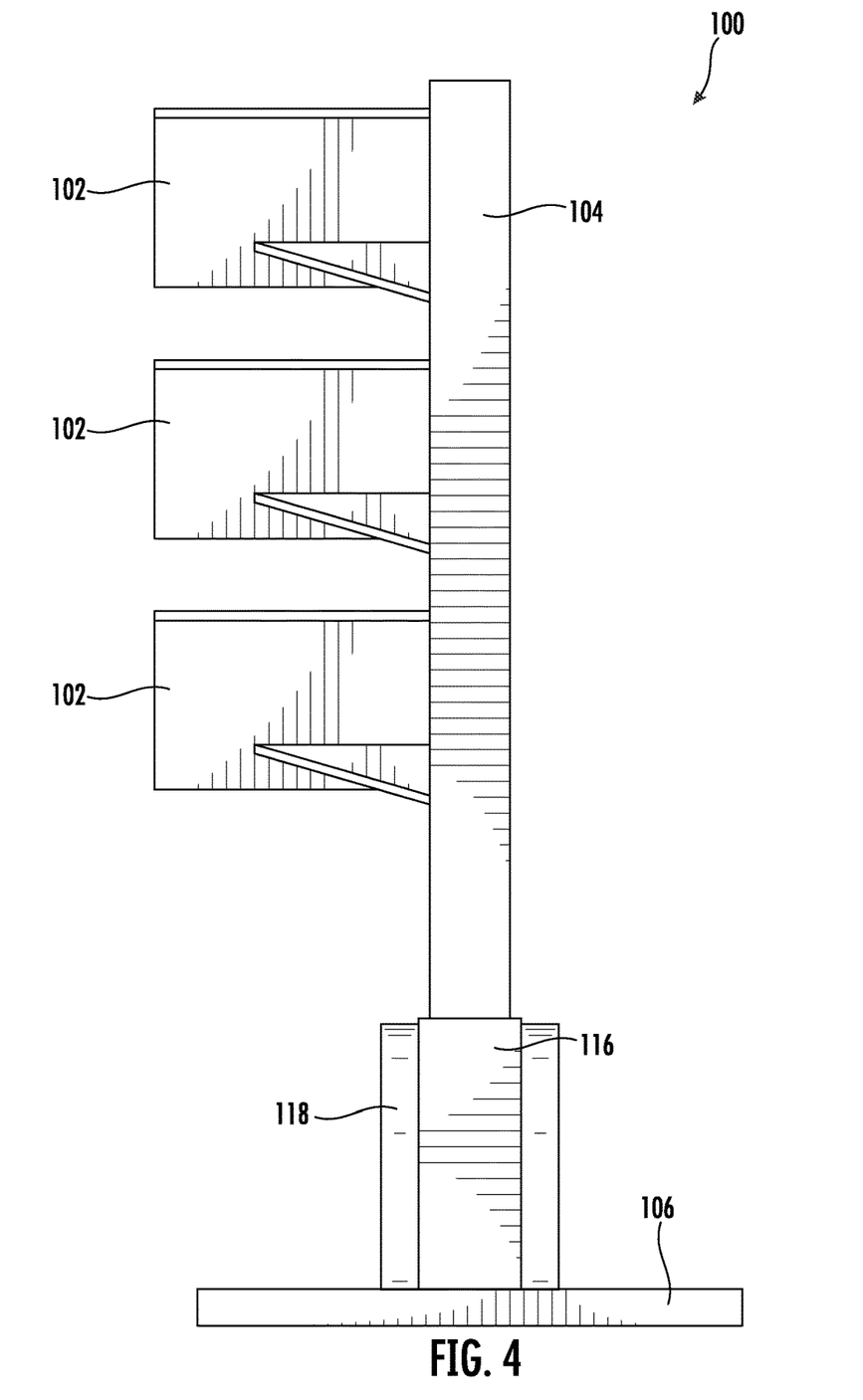
FIG. 4 is a front view of the guide-on post shown in FIG. 1 with the steps in the extended position.
Figure 5:
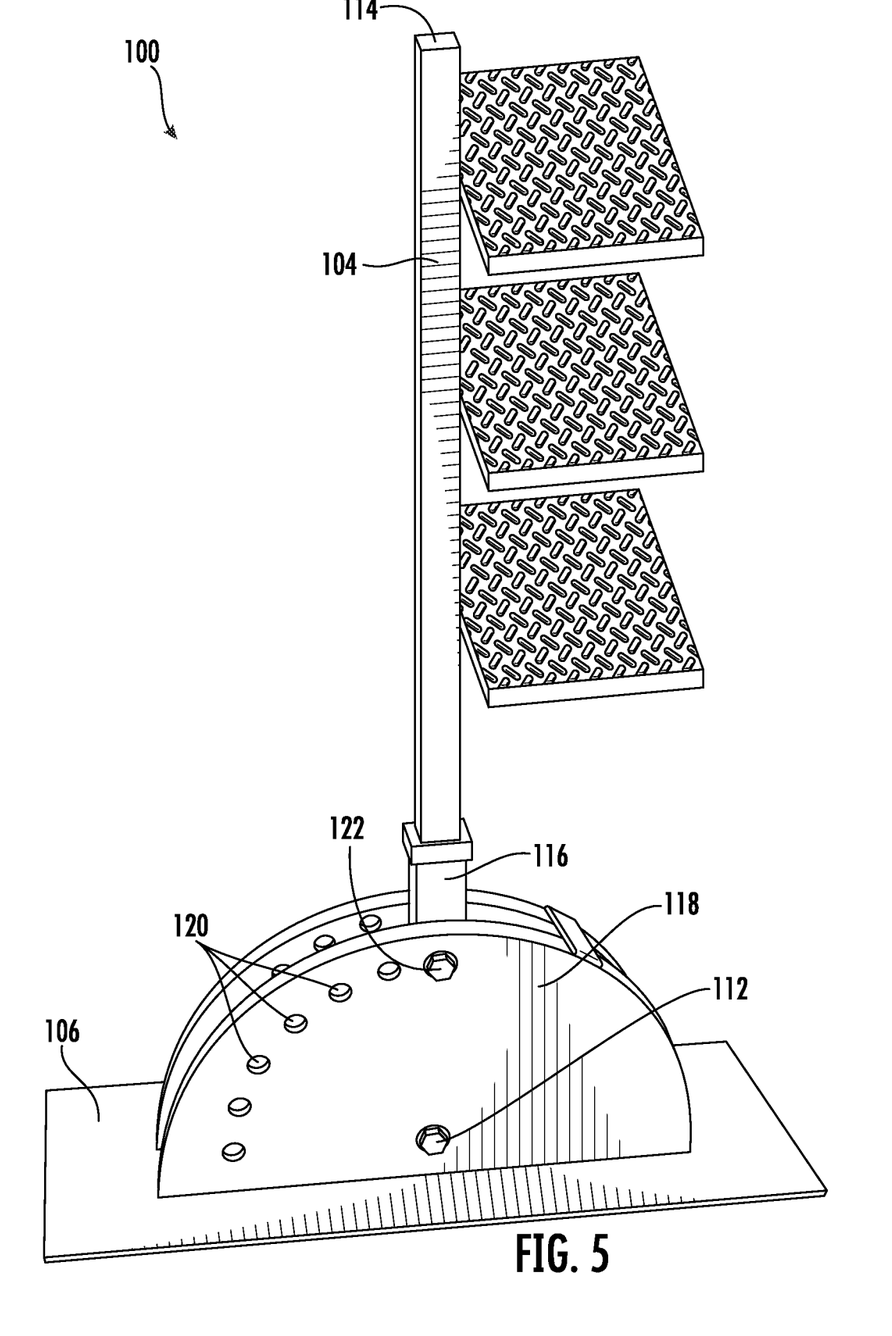
FIG. 5 is an inner side view of the guide-on post shown in FIG. 1 with the arm in the guiding position.
Figure 8:
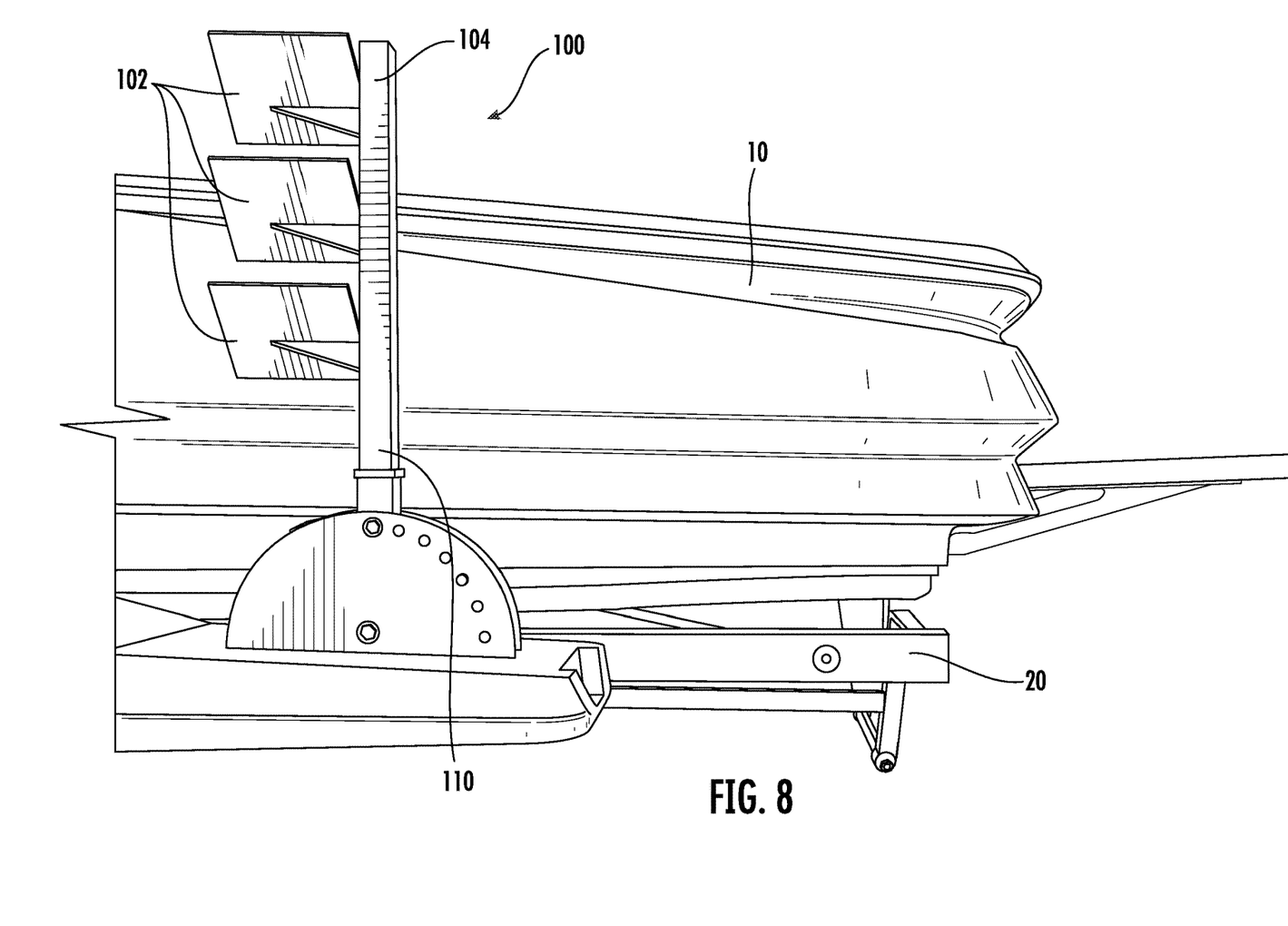
FIG. 8 is an outer side view of the guide-on post shown in FIG. 1 coupled to a boat trailer with the arm in the guiding position.
Figure 10:
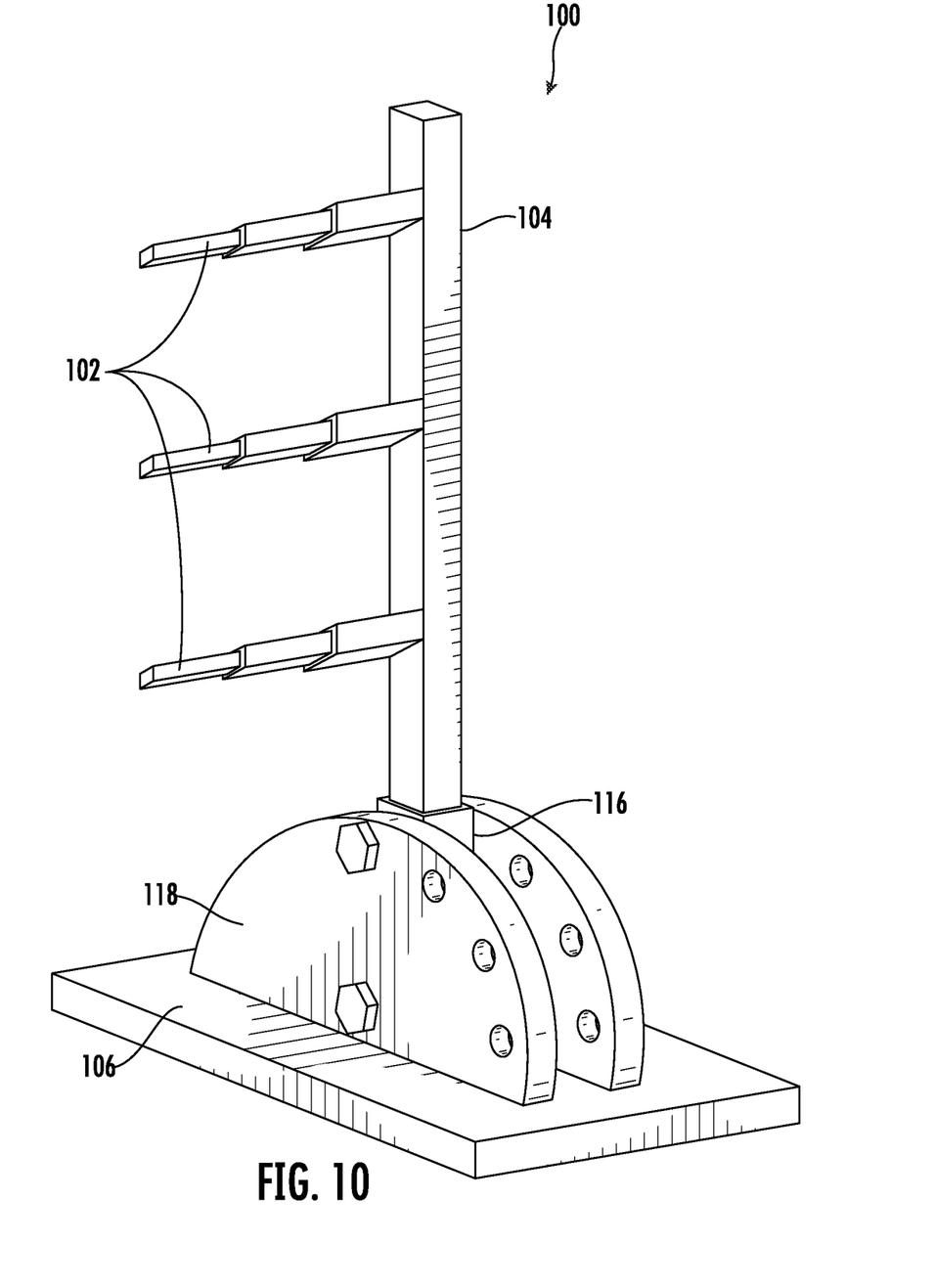
FIG. 10 is a perspective view of the guide-on post shown in FIG. 1 with steps that telescope into the arm.
Figure 11:
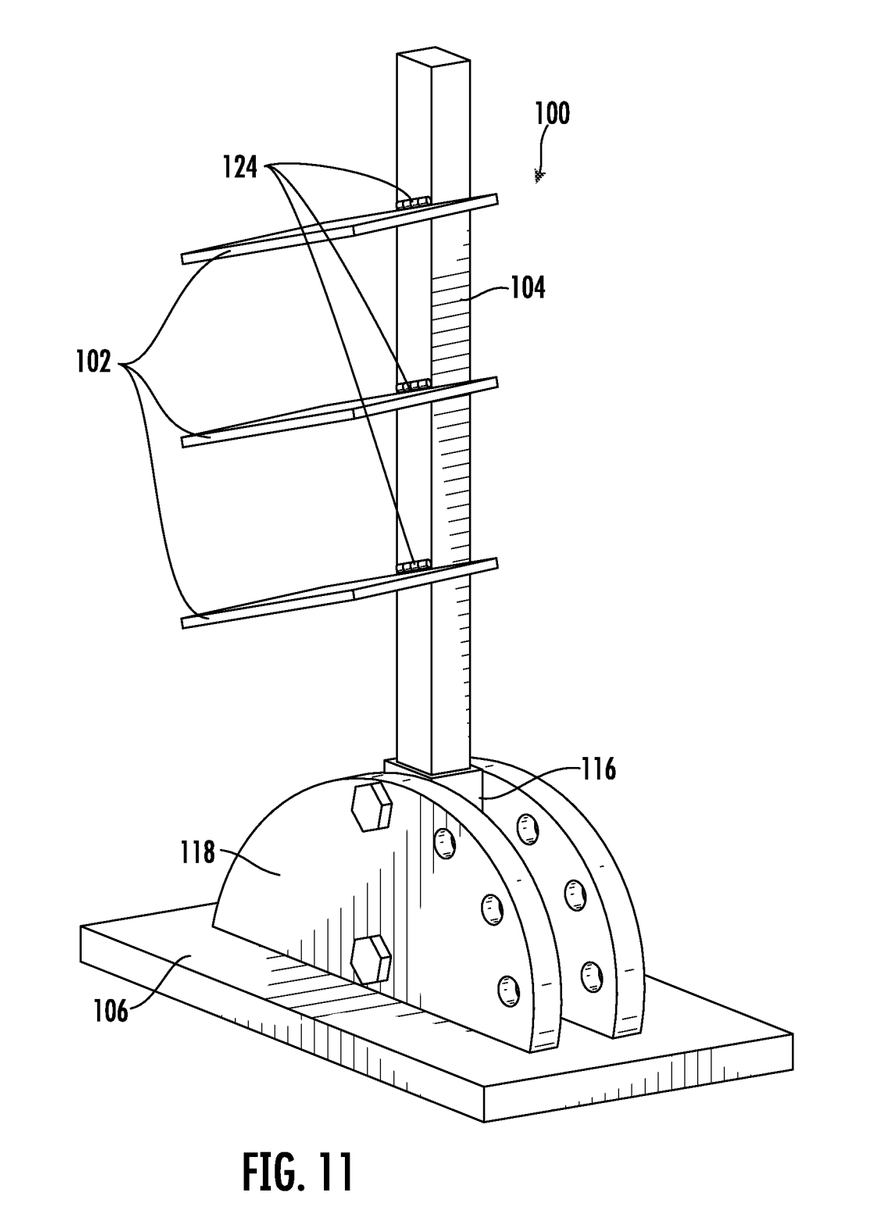
FIG. 11 is a perspective view of the guide-on post shown in FIG. 1 with steps that fold with respect to the arm.

When the steps 102 are in the stored position, each of the steps 102 may be positioned within the perimeter of the boat trailer 20. Thus, when each of the steps 102 are in the stored position, the ability of the boat trailer 20 to fit through any space is unaffected by the steps 102. In some embodiments, the steps 102 do extend beyond the perimeter of the boat trailer 20 when the steps 102 are in the stored position, but do so much less than when in the extended position. In some embodiments, the steps 102 are moved from the stored position to the extended position by rotating the steps 102 about the length of the arm 104, as shown in FIGS. 3 and 4. Thus, when the steps 102 are in the stored position, the steps 102 extend along the length of the boat trailer 20 (see FIG. 8) and when the steps 102 are in the extended position, the steps 102 extend away from the boat trailer 20 (see FIG. 9). The steps 102 may rotate about the length of the arm 104 independent of the arm 104 or may rotate with the arm 104 about the length of the arm 104. The steps 102 may be configured to automatically move into the extended position when the arm 104 moves into the boarding position. For example, in embodiments where the arm 104 rotates from the guiding position to the boarding position, the steps 102 may be operatively coupled to the arm 104 in a way that causes the steps 102 to rotate out into the extended position as the arm 104 rotates into the boarding position. The steps 102 may also be configured to telescope into the arm 104 to move into the stored position. For example, as shown in FIG. 10, the steps 102 may have several sections, with each section sized and shaped to slide into the adjacent section, so that the steps 102 can be retracted into the arm 104. The steps 102 may also be foldable with respect to the arm 104. For example, as shown in FIG. 11, the steps 102 may be attached to the arm 104 through a hinge 124 that allows the steps 102 to fold up against the arm 104 into a stored position. Other methods of storing the steps 102 so that the boat trailer 20 is not significantly widened will be apparent to those of skill in the art, and are considered within the scope of this disclosure.

In some embodiments, the guide-on post 100 is configured to be stored beneath the boat 10 on the boat trailer 20. Thus, the guide-on post 100 may be configured to rotate or move from a position adjacent the edge of the boat trailer 20 to a position within the perimeter of the boat trailer 20. Thus, even in embodiments where the steps 102 do extend beyond the perimeter of the boat trailer 20 when the steps 20 are in the stored position as discussed above, the guide-on post 100 may be configured to move into a position where the guide-on post 100 does not affect the ability of the boat trailer 20 to maneuver through tight spaces. As discussed above, such embodiments may help the guide-on post 100 to enable the boat trailer 20 to meet Department of Transportation rules for trailers and make it easier for the boat trailer 20 to be loaded into a garage or other tight space.

Any of the movements described above, either of the arm 104 or of the steps 102, may be performed manually by applying a force or torque to some component of the guide-on post 100. For example, the steps 102 may be rotated from the stored position to the extended position by twisting the arm 104 or by pulling the steps 102 out from the stored position. As another example, the steps 102 may be rotated from the stored position to the extended position by decoupling the arm 104 from the sleeve 116, turning the arm 104 to the desired orientation with the steps 102 oriented away from the boat trailer 20, and then re-coupling the arm 104 and the sleeve 116. In some embodiments, the different components of the guide-on post 100, such as the arm 104 or the steps 102, may be biased towards specific positions. For example, the arm 104 may be biased towards the guiding position, but may be pushed down into the boarding position and locked into place. To move the arm 104 back into the guiding position, the user may only need to release the lock and the arm 104 may move automatically back into the guiding position due to the bias. The bias may be applied using a torsional spring, compression spring, or some other biasing element as known in the art. Similarly, the steps 102 may be biased towards the extended position or the stored position, the arm 104 may be biased toward the boarding position, and/or the guide-on post 100 may be biased toward or away from the position beneath the boat 10 disclosed above.

The movements described herein may also be automated, where the user has access to controls which communicate the desired positions of the arm 104 and the steps 102. Thus, to move the arm 104 into the boarding position, for example, the user may simply press a button or pull a lever, etc. which tells the guide-on post 100 to move the arm 104 into the boarding position. As will be obvious to those of skill in the art, similar controls can be implemented for any of the positions of the any of the components of the guide-on post 100. The controls may be accessible from any location. For example, the controls may be accessible at the top of the arm 104 to allow the guide-on post 100 to be operated from inside the boat 10. Similarly, the controls may be accessible at the bottom of the guide-on post 100 so that guide-on post 100 can be operated from the ground next to the boat trailer 20. Thus, the arm 104 may be configured to be operated, or moved between the guiding position and the boarding position, both from a proximal end of the arm 104 adjacent the attachment point 112 of the arm 104 and from a distal end of the arm 104 adjacent the endpoint 114 of the arm 104. The guide-on post 100 may also be remote controlled, so that the guide-on post 100 may be operated from a vehicle towing the boat trailer 20 or from another remote location. In such embodiments, the guide-on post 100 may be operated with a wired connection or a wireless connection.

Figure 9:
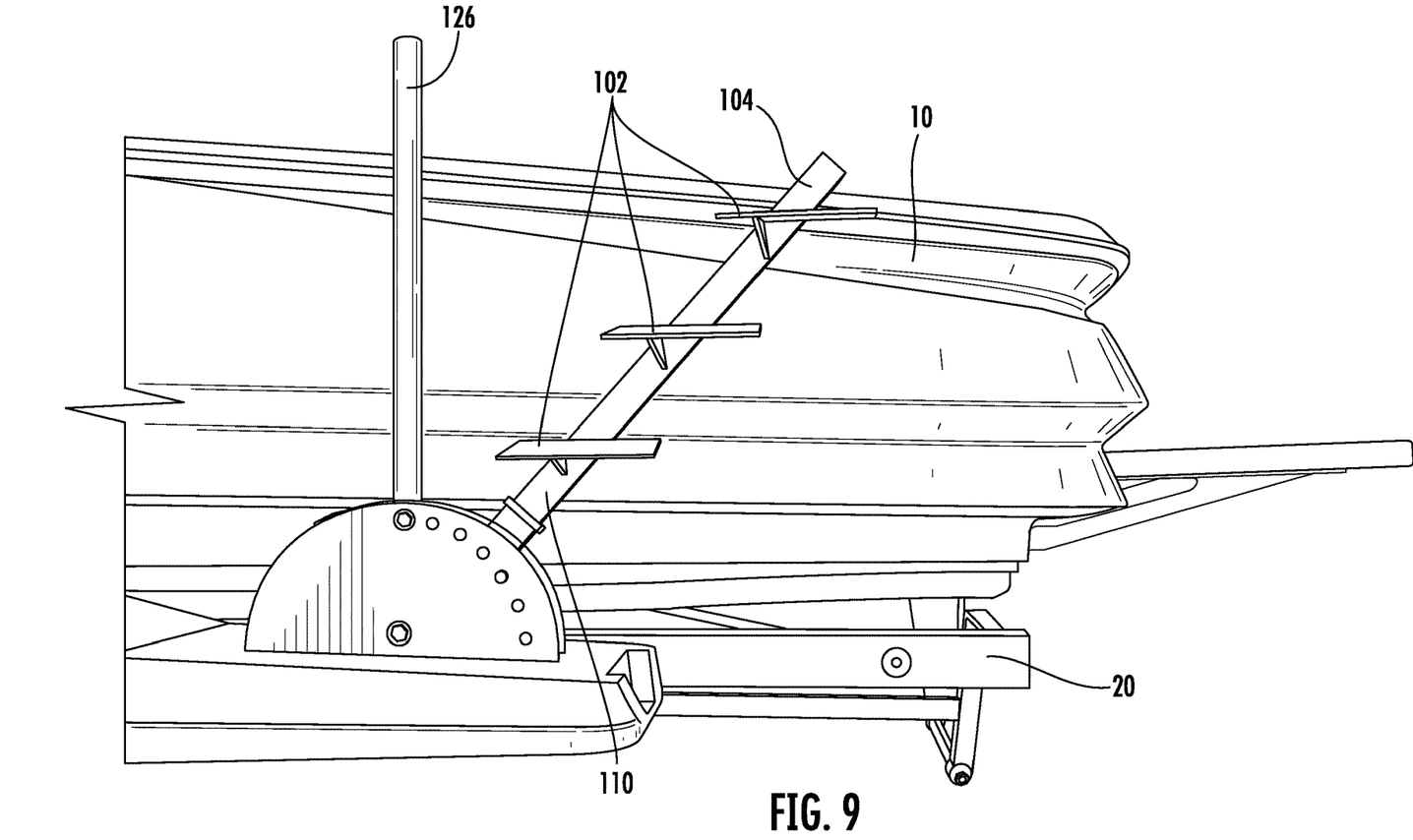
FIG. 9 is an outer side view of the guide-on post shown in FIG. 1 coupled to a boat trailer with the arm in the boarding position.

As shown in FIG. 9, the guide-on post 100 may further comprise a stationary arm 126 that is configured to remain in place as the arm 104 moves between the guiding position and the boarding position. Thus, when the arm 104 is in the guiding position, the stationary arm 126 and the arm 104 may be aligned, and when the arm 104 is in the boarding position, the stationary arm 126 and the arm 104 may be separated, as shown in FIG. 9. In such an embodiment, the stationary arm 126 may also function as a handhold, handle, or handrail. The stationary arm 126 may have any shape, and thus may be configured to provide a handhold, handle, or handrail along the length of the arm 104 when the arm 104 is in the boarding position. Relatedly, the guide-on post 100 may have a handle or handrail positioned adjacent to the arm 104 and configured to provide a handhold for a user of the guide-on post 100 as the user climbs the step 102. The handle or handrail may be vertical, as shown in FIG. 9, or may extend along the length of the arm 104.

The guide-on post 100 may comprise a sacrificial component that is configured to fail prior to other components of the guide-on post 100 when a force is applied to the guide-on post 100. This allows the important components of the guide-on post 100, such as the arm 104, to avoid failure by instead causing the failure of the sacrificial component. The arm 104 may be configured to break away from the guide-on post 100 without causing damage to the arm 104. For example, the pin 122 may be configured to break before the arm 104 when a large force is applied to the arm 104, such as when the boat 10 impacts the guide-on post 100. This allows the arm 104 to break away without any damage to the arm 104. The pin 122 could then easily be replaced, reattaching the arm 104 to the guide-on post 100 at a low cost, and with minimal effort. Other components could also be introduced or configured as the sacrificial component.

It will be understood that implementations of a guide-on post are not limited to the specific assemblies, devices and components disclosed in this document, as virtually any assemblies, devices and components consistent with the intended operation of a guide-on post may be used. Accordingly, for example, although particular guide-on posts, and other assemblies, devices and components are disclosed, such may include any shape, size, style, type, model, version, class, measurement, concentration, material, weight, quantity, and/or the like consistent with the intended operation of guide-on posts. Implementations are not limited to uses of any specific assemblies, devices and components; provided that the assemblies, devices and components selected are consistent with the intended operation of a guide-on post.

Accordingly, the components defining any guide-on post may be formed of any of many different types of materials or combinations thereof that can readily be formed into shaped objects provided that the materials selected are consistent with the intended operation of a guide-on post. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various guide-on posts may be manufactured using conventional procedures as added to and improved upon through the procedures described here. Some components defining a guide-on post may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling guide-on posts are not limited to the specific order of steps as disclosed in this document. Any steps or sequence of steps of the assembly of a guide-on post indicated herein are given as examples of possible steps or sequence of steps and not as limitations, since various assembly processes and sequences of steps may be used to assemble guide-on posts.

The implementations of a guide-on post described are by way of example or explanation and not by way of limitation. Rather, any description relating to the foregoing is for the exemplary purposes of this disclosure, and implementations may also be used with similar results for a variety of other applications employing a guide-on post.

What is claimed is:

1. A guide-on post comprising:
   a base configured to attach to a boat trailer;
   an arm hingedly coupled to the base and having a length and an outer side configured to face away from the boat trailer, the arm configured to rotate in a direction perpendicular to the length between a guiding position and a boarding position, wherein when the arm is in the guiding position, the arm extends away from the base in a substantially vertical upward direction, and when the arm is in the boarding position, the arm is rotated between and including 20 degrees and 70 degrees from the guiding position; and
   at least one step coupled to the arm and moveable between a stored position and an extended position, wherein when the at least one step is in the stored position, the at least one step is positioned within a perimeter of the boat trailer and when the at least one step is in the extended position, the at least one step extends away from the outer side of the arm perpendicular to the length of the arm and extends outside of the perimeter of the boat trailer;
   wherein, when the arm is in the guiding position, the guide-on post is configured to indicate a location of the boat trailer when the boat trailer is submerged in water, and when the arm is in the boarding position and the at least one step is in the extended position, the guide-on post is configured to facilitate boarding a boat secured to the boat trailer.

2. The guide-on post of claim 1, wherein the at least one step is configured to rotate about the length of the arm to move the at least one step between the stored position and the extended position.

3. The guide-on post of claim 1, wherein the at least one step is configured to telescope into the arm to move into the stored position.

4. The guide-on post of claim 1, wherein the at least one step is foldable with respect to the arm.

5. The guide-on post of claim 1, wherein the base comprises a bracket and the arm is hingedly coupled to the bracket, the bracket having a plurality of holes and a pin configured to extend through a hole of the plurality of holes and lock the arm in a position aligned with the hole of the plurality of holes.

6. The guide-on post of claim 1, wherein the at least one step is configured to automatically move to the extended position when the arm moves to the boarding position.

7. A guide-on post comprising:
a base configured to attach to a boat trailer;
an arm hingedly coupled to the base and having an outer side configured to face away from the boat trailer, the arm configured to rotate in a direction perpendicular to the arm between a guiding position and a boarding position, wherein when the arm is in the guiding position, the arm extends away from the base in an upward direction, and when the arm is in the boarding position, the arm is rotated away from the guiding position; and
at least one step coupled to and extending away from the outer side of the arm;
wherein, when the arm is in the guiding position, the guide-on post is configured to indicate a location of the boat trailer when the boat trailer is submerged in water, and when the arm is in the boarding position, the guide-on post is configured to facilitate boarding a boat secured to the boat trailer.

8. The guide-on post of claim 7, wherein the at least one step is moveable between a stored position and an extended position, wherein when the at least one step is in the stored position, the at least one step is positioned within a perimeter of the boat trailer and when the at least one step is in the extended position, the at least one step extends away from the outer side of the arm outside of the perimeter of the boat trailer.

9. The guide-on post of claim 7, wherein when the arm is in the guiding position, the arm extends away from the base in a substantially vertical upward direction and when the arm is in the boarding position, the arm is rotated less than or equal to 90 degrees from the guiding position.

10. The guide-on post of claim 7, wherein the at least one step is configured to rotate about a length of the arm to move the at least one step between a stored position and an extended position.

11. The guide-on post of claim 7, wherein the at least one step is configured to telescope into the arm to move between a stored position and an extended position.

12. The guide-on post of claim 7, wherein the at least one step is foldable with respect to the arm.

13. The guide-on post of claim 7, further comprising a handrail positioned adjacent to the arm and configured to provide a handhold for a user of the guide-on post.

14. A guide-on post comprising:
an arm configured to hingedly couple to a boat trailer and configured to rotate between a guiding position and a boarding position; and
at least one step coupled to and extending away from the arm;
wherein, when the arm is in the guiding position, the guide-on post is configured to indicate a location of the boat trailer when the boat trailer is submerged in water, and when the arm is in the boarding position, the guide-on post is configured to facilitate boarding a boat secured to the boat trailer.

15. The guide-on post of claim 14, wherein the arm is configured to rotate between the guiding position and the boarding position in a direction perpendicular to the arm.

16. The guide-on post of claim 14, wherein the at least one step is moveable between a stored position and an extended position, wherein when the at least one step is in the stored position, the at least one step is positioned within a perimeter of the boat trailer and when the at least one step is in the extended position, the at least one step extends away from the outer side of the arm outside of the perimeter of the boat trailer.

17. The guide-on post of claim 14, wherein, when the arm is in the guiding position, the arm extends away from the boat trailer in a substantially vertical upward direction, and when the arm is in the boarding position, the arm is rotated less than or equal to 90 degrees from the guiding position.

18. The guide-on post of claim 14, wherein the at least one step is configured to rotate about a length of the arm to move the at least one step between a stored position and an extended position.

19. The guide-on post of claim 14, wherein the at least one step is configured to telescope into the arm to move between a stored position and an extended position.

20. The guide-on post of claim 14, wherein the at least one step is foldable with respect to the arm.

21. The guide-on post of claim 14, wherein the arm is configured to be operated both from a proximal end of the arm and from a distal end of the arm opposite the proximal end of the arm.

22. The guide-on post of claim 14, wherein the guide-on post is configured to be stored beneath the boat on the boat trailer.

23. The guide-on post of claim 14, wherein the arm is configured to break away from the guide-on post without causing damage to the arm.

* * * * *